United States Patent [19]

Riach

[11] 4,411,321
[45] Oct. 25, 1983

[54] CULTIVATING IMPLEMENTS

[76] Inventor: Allan Riach, Ayton Mains, Eyemouth, Berwickshire, Scotland

[21] Appl. No.: 382,563

[22] Filed: May 27, 1982

Related U.S. Application Data

[63] Continuation of Ser. No. 181,238, Aug. 25, 1980, abandoned.

[30] Foreign Application Priority Data

Aug. 25, 1979 [GB] United Kingdom ................. 7929681
Jan. 30, 1980 [GB] United Kingdom ................. 8003169

[51] Int. Cl.³ ...................... A01B 33/02; A01B 13/00
[52] U.S. Cl. ........................................ 172/40; 172/89; 172/118
[58] Field of Search .................. 172/40, 118, 97, 103, 172/54, 48, 84, 87, 86, 88, 85, 123, 89, 21

[56] References Cited

U.S. PATENT DOCUMENTS

| | | | |
|---|---|---|---|
| 2,659,285 | 11/1953 | Burr | 172/88 |
| 3,743,025 | 7/1973 | Thatcher | 172/21 |
| 4,111,263 | 9/1978 | Lely | 172/54 |
| 4,189,006 | 2/1980 | Lely | 172/118 |
| 4,252,199 | 2/1981 | Lely | 172/118 |

FOREIGN PATENT DOCUMENTS

| | | | |
|---|---|---|---|
| 129925 | 6/1948 | Australia | 172/118 |
| 2652734 | 1/1977 | Fed. Rep. of Germany . | |

Primary Examiner—Richard J. Johnson
Attorney, Agent, or Firm—Mason, Fenwick & Lawrence

[57] ABSTRACT

A cultivating implement to be carried by a vehicle comprises a frame (10) having spaced and opposed members (11, 12) between which a tine-carrying bar (13) is supported for gyratory motion the direction of which is counter to the direction of forward rotation of the ground wheels of the carrying vehicle and which derives from and is centered on the axis of axially-aligned stub shafts (14,15) adapted to be driven from a prime mover and supported in bearings mounted in or on said opposed members of the frame. Preferably the mutually-opposed ends of the stub shafts (14, 15) are cranked in mirror-image fashion and the tine-carrying bar (13) is supported between bearing arrangements (28, 29) centered on the crank arms. The angle of presentation of the tines to the ground is preferably selectable to accord with the nature of the work to be done and the tine sweeps or shovels to be used therefor.

7 Claims, 4 Drawing Figures

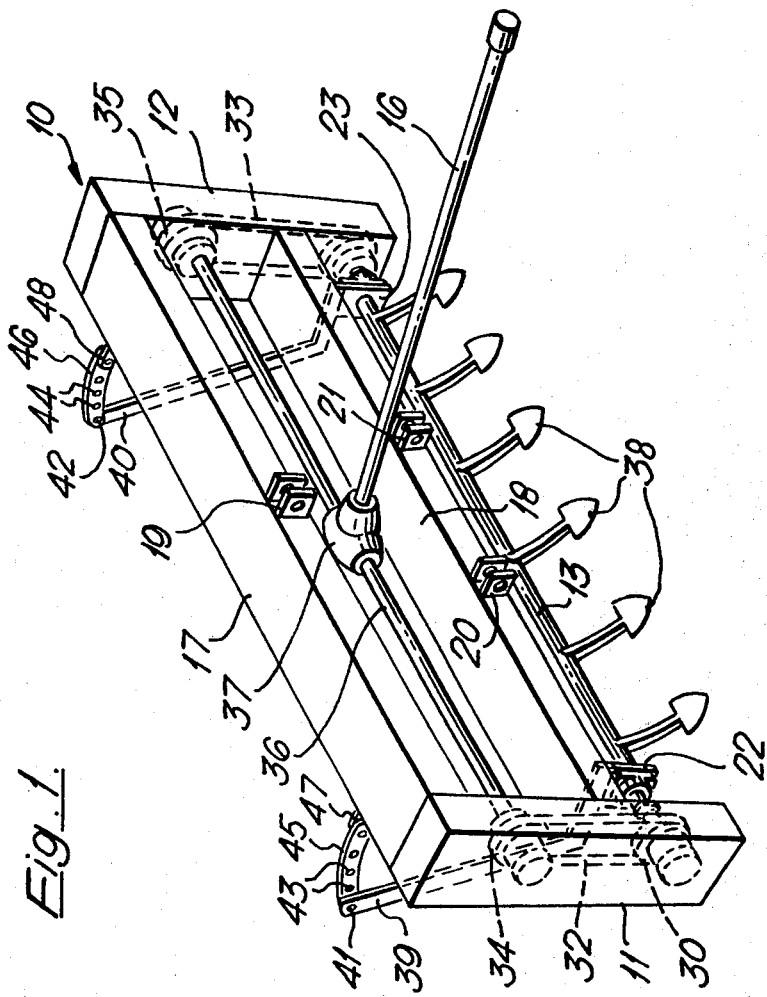

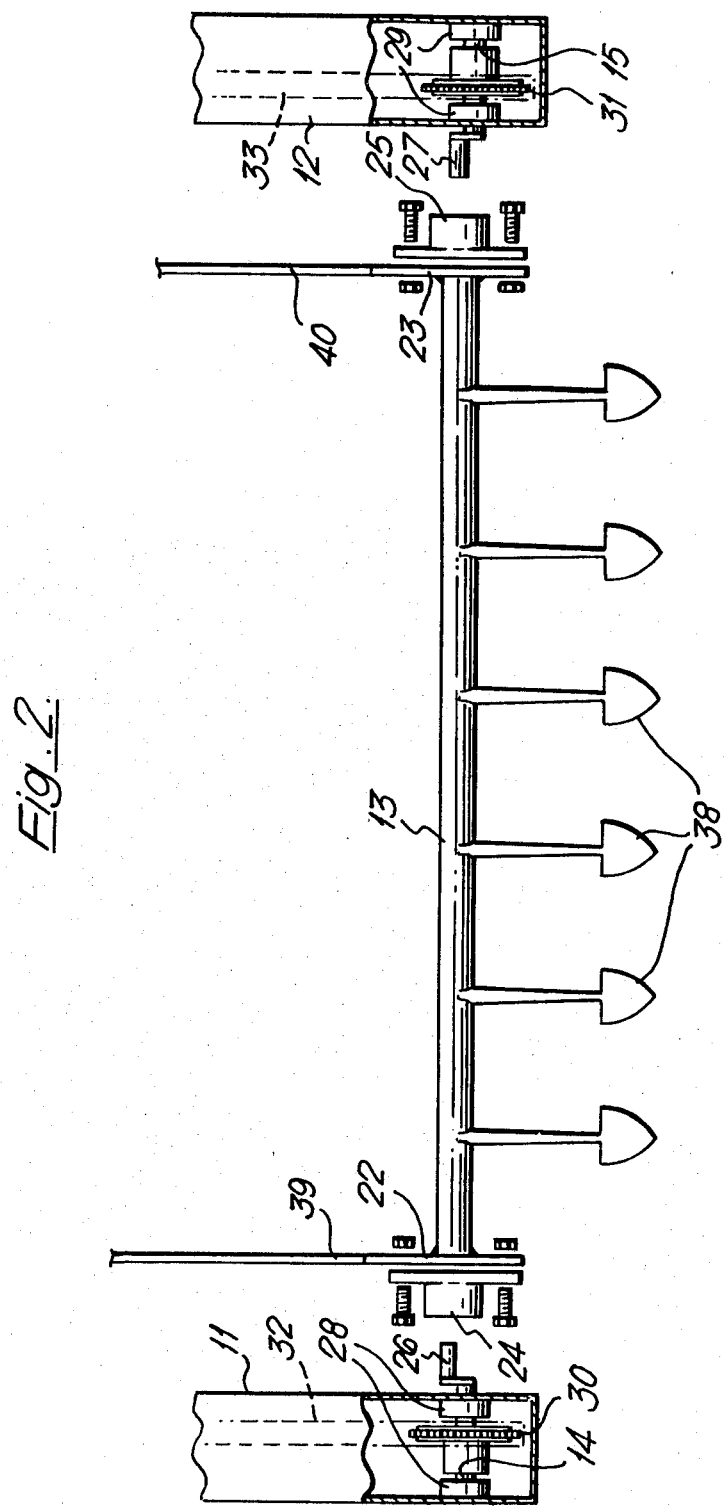

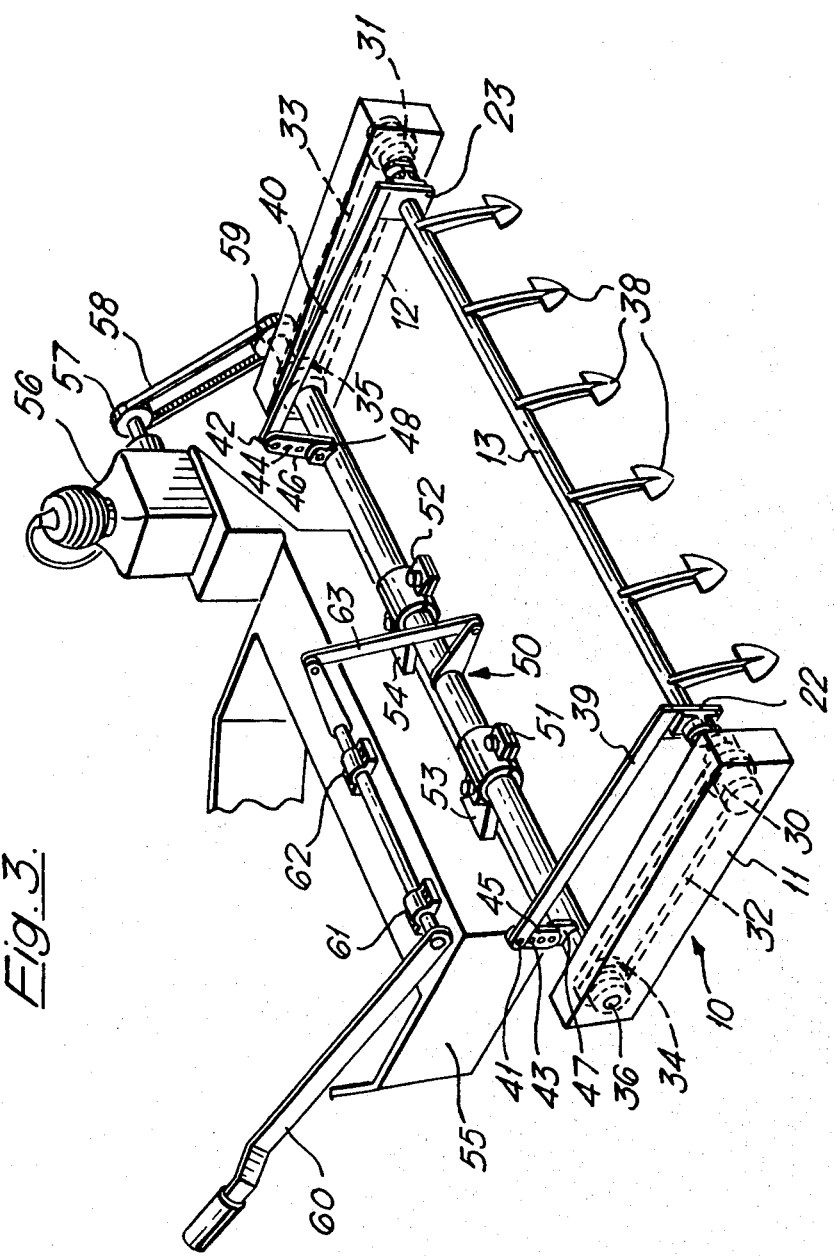

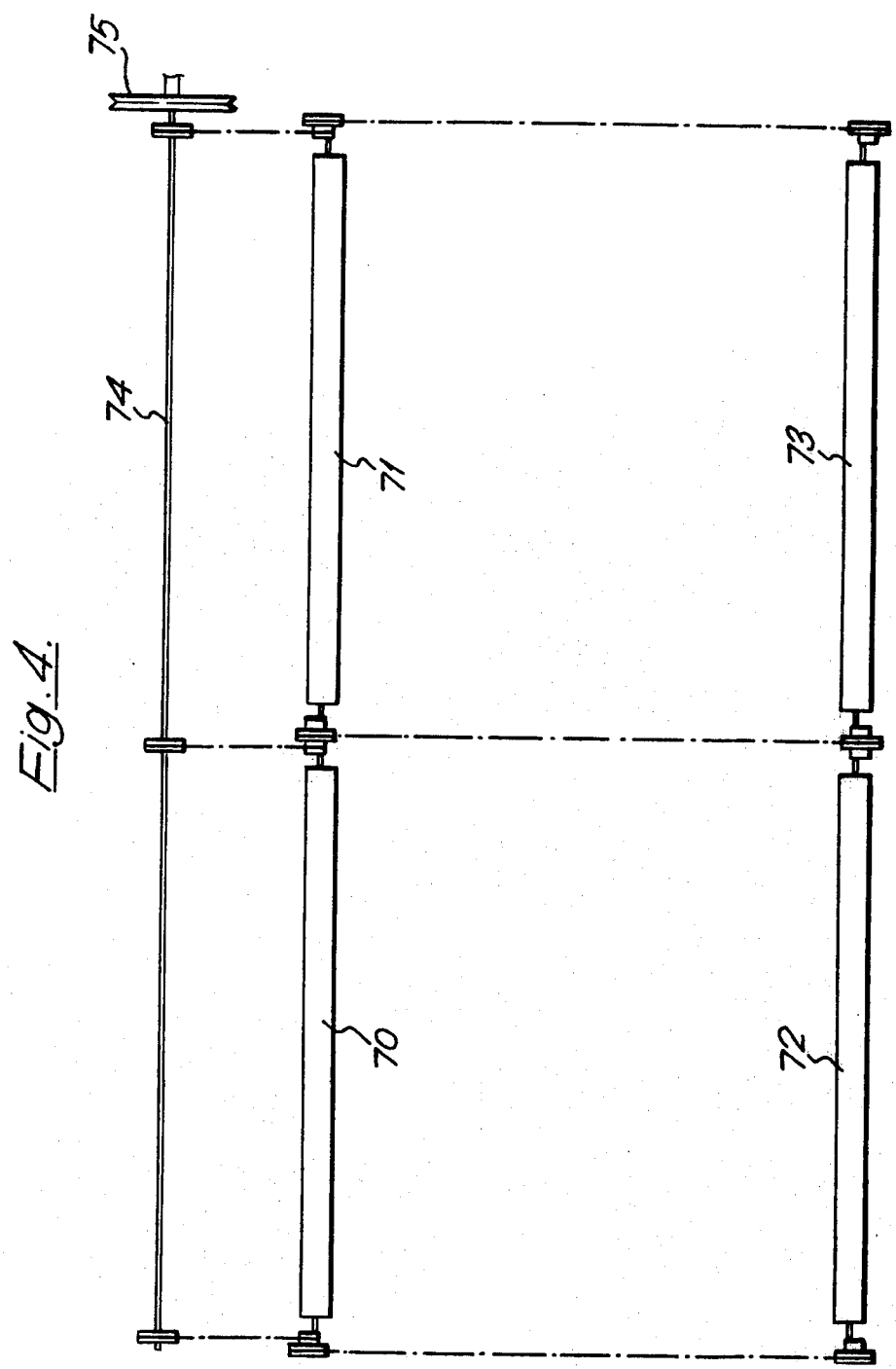

CULTIVATING IMPLEMENTS

This is a continuation of application Ser. No. 181,238, filed Aug. 25, 1980, now abandoned.

This invention relates to cultivating implements.

The object of the present invention is to provide cultivating implements which are efficient in operation and are economical in the use of power.

This object is achieved in accordance with the present invention by a cultivating implement comprising a frame supporting between spaced and opposed members thereof a tine-carrying bar for gyratory motion the direction of which is the same as the direction of forward travel of a vehicle mounting the implement, i.e., is counter to the direction of forward rotation of the ground wheels of said vehicle, and which derives from and is centred on the axis of axially-aligned stub shafts adapted to be driven from a prime mover and supported in bearings mounted in or on said opposed members of the frame.

Preferably the mutually-opposed ends of the stub shafts are cranked in mirror-image position and the tine-carrying bar is supported between bearing arrangements centred on the crank arms.

Preferably, also, the angle of presentation of the tines to the ground is determined by two bars one end of each of which is secured to a different end of the tine-carrying bar and the other end of each of which is pivotally connected to one end of a respective strip whereof the other end is pivotally connected to a lug in the frame remote from the tine-carrying bar.

Embodiments of the invention will now be described, by way of example, with reference to the accompanying drawings, in which:

FIG. 1 is a perspective view from one side and above and towards the front of a cultivating implement in accordance with the invention;

FIG. 2 is an exploded front elevation of the lower part of the cultivating implement shown in FIG. 1 with the front surfaces of the side members of the frame omitted to show the arrangements internally of said side members;

FIG. 3 is a perspective view from one side and above and towards the rear of another cultivating implement in accordance with the invention; and FIG. 4 is a diagrammatic plan view illustrating ganged tine-carrying bars in tandem.

Referring now to the drawings, and firstly to FIGS. 1 and 2, the cultivating implement shown comprises a frame 10 supporting between spaced and opposed members 11 and 12 thereof a tine-carrying bar 13 for gyratory motion the direction of which is counter to the direction of forward rotation of the ground wheels of a vehicle (not shown) carrying the cultivator, which motion derives from and is centred on the axis of axially-aligned stub shafts 14 and 15 adapted to be driven through the intermediary of a shaft 16 to be coupled to the vehicle P.T.O. shaft.

The frame 10 is of steel of rectangular section and is regular in shape with the members 11 and 12 extending with their major surfaces parallel to one another from a cross-member 17 and being interconnected at points about two-thirds of their lengths from the cross-member 17 by a transom 18 parallel to the latter, the major surfaces of the cross-member 17 and of the transom 18 being normal to the major surfaces of the members 11 and 12.

When the cultivating implement of FIG. 1 is hitched to a vehicle, the members 11 and 12 are at least substantially upright and the cross-member 17 is uppermost. The cross-member 17 and the transom 18 have apertured pairs of forwardly-projecting lugs 19, 20 and 21 for conventional three-point hitching to the vehicle.

The tine-carrying bar 13 extends between end plates 22 and 23 welded thereto and parallel to the major faces of the members 11 and 12 of the frame 10, and flanged journal boxes 24 and 25 are bolted to the end plates 22 and 23, respectively. Supported in the bearings of the journal boxes 24 and 25 are crank arms 26 and 27 respectively formed by cranking in mirror-image fashion the inner and mutually-opposed ends of the co-axial stub shafts 14 and 15, respectively, projecting through the members 11 and 12, respectively. The stub shafts 14 and 15 are supported in bearings 28 and 29 fitted within the members 11 and 12, respectively, near the lower ends of the latter. The teeth of sprocket wheels 30 and 31 fast on the stub shafts 14 and 15, respectively, are engaged by endless chains 32 and 33, respectively, extending within the members 11 and 12 and also entrained about sprockets 34 and 35 fast on a shaft 36 parallel to the bar 13 and extending across the frame 10 in the upper part thereof between the members 11 and 12, the ends of the shaft 36 being supported in bearings fitted within the members 11 and 12. Fitted centrally of the shaft 36 is a level gear box 37 through which the shaft 36 is adapted to receive drive from the shaft 16 to be coupled to the vehicle P.T.O. shaft. The four sprocket wheels are identical with one another whereby all run at the same speed when the shaft 36 is rotated. The throw of the cranks at the inner ends of the stub-shafts 14 and 15 ensures however, that the bar 13 executes one complete gyration for each revolution of the shaft 36 with the consequence that the tines 38 carried by the bar 13 perform digging motions which are fast relative to rotation of the shaft 36 and counter to the direction of forward rotation of the ground wheels of the vehicle, and as a result of which the soil is broken up and weeds and trash travel up the tines 38, are shaken free of soil and are deposited on the surface of the ground.

The tines 38 are rigid and a variety of sweeps and shovels may be attached thereto for different types of cultivation.

The angle of presentation of the tines 38 to the ground is maintained substantially constant by identical rigid elbow bars 39 and 40, one at each side of the frame 10, the bars 39 and 40 having relatively short and relatively long arms whereof the former are welded to the end plates 22 and 23, respectively and the outer ends of the latter have bolt holes therethrough enabling pivotal coupling of the bars 39 and 40, as at 41 and 42 respectively using a selected hole of a series of bolt holes 43 and 44, respectively, through identical strips 45 and 46, respectively, pivotally connected to lugs 47 and 48 on the rear face of the cross-member 17, one near to each end of the latter. The longer arms of the bars 39 and 40 are of length sufficient to ensure that the tips of the tines approximately duplicate the gyratory movement of the bar 13. Adjustment of the angle of presentation of the tines to the ground is, of course, effected by reloading the pivotal connections of the bars 39 and 40 to the strips 45 and 46.

The cultivating implement illustrated in FIG. 3 is for use with a vehicle which is not equipped with a hydraulic lift or P.T.C. shaft, for example a small grass cutting tractor. The implement must therefore, have its own drive and mounting arrangement, but the arrangements for transmitting the drive to the tine-carrying bar and for holding the latter to determine the angle of presentation of the tines to the ground, are identical to those already described with reference to FIGS. 1 and 2, and to avoid duplication of description like parts have been designated in FIG. 3 with the reference numerals already used.

In FIG. 3 the frame 10 is disposed substantially horizontally and the member 17 of FIG. 2 is replaced by a hollow tube 50 interconnecting the side members 11 and 12 and swivellable in bushes 52 and 52. The bushes are split diametrically to enable location of the tube 50 prior to the half-bushes being bolted together, and one half of each of the two bushes 51 and 52 has an integrated support lug 53 and 54, respectively, which is welded to a carrier 55 shaped to fit on to the rear of the tractor and adapted to be secured in position thereat.

An engine 56 mounted at one side of the carrier 55 has an output shaft on which is a V-pulley 57 from which the drive is transmitted by a V-belt 58 to a V-pulley 59 fast on the adjacent end of the shaft 36 which projects through the side member 12 of the frame 10.

A cranked hand lever 60 is mounted on the carrier 55 through bushes 61 and 62 and is connected through a linkage arrangement 63 to the tube 50 to enable the tines of the implement to be swivelled into and out of the ground.

The manner of mounting the cultivating implement forms no part of the present invention and indeed the implement could be in front or underneath the tractor.

Referring now to FIG. 4 which is a purely diagrammatic illustration of ganged tine-carrying bars in tandem, the four tine-carrying bars 70, 71, 72 and 73 are similar to the bar 13 of FIGS. 1, 2 and 3, and the transmission arrangement resulting in the bars each performing one complete gyration for each revolution of the driven shaft 74 corresponds to that already described hereinbefore. It will be noted that the tine-carrying bars 72 and 73 will be 180° out of phase with the bars 70 and 71 driving the gyratory motions of the bars, this being mechanically advantageous. A V-pulley 75 is shown at one end of the drive shaft 74 for transmission of drive thereto from a prime mover such as a tractor P.T.O. shaft.

Among the advantages of a cultivating implement according to the invention are that a heavy tractor is not required to carry the implement because of the fast movement of the tines relative to the tractor movement; wear of tractor tires is reduced because the tractor is more or less simply carrying the implement and not physically pulling same through the ground; theoretically a 20 h.p. tractor should be able to cultivate a strip 20 feet wide and 9 inches deep; weeds and trash are brought to the surface of the ground due to the circular motion of the tines; the implement is very safe in operation; and there is little wear of the tines because of the small and fast movement thereof.

I claim:

1. A cultivating implement adapted to be mounted from a ground-travelling vehicle, said implement comprising a frame having transversely spaced and opposed members, bearing means carried by said members, stub shafts adapted to be driven from a prime mover and supported in said bearing means in axial alignment along a generally-horizontal transverse axis, a tine-carrying bar supported at opposite ends between said stub shafts for gyrating motion in a cylindrical path about said transverse axis in a direction counter to the direction of forward rotation of the ground wheels of a vehicle mounting the implement, the tines carried by said bar extending generally downward therefrom and having tips to which gyratory movement about a circular path wholly below said transverse axis and concentric with a second axis paralleling said transverse axis is imparted by said gyrating motion, the direction of tip movement below said second axis being the same as the forward direction of travel over the ground of a vehicle mounting the implement and being such as then to cause the tines to effect fast digging motions into the ground.

2. A cultivating implement according to claim 1, in which the mutually-opposed ends of the stub shafts are cranked in mirror-image fashion and the tine-carrying bar is supported between bearing arrangements centered on the crank arms.

3. A cultivating implement according to claim 2 in which the angle of presentation of the tines to the grounds is determined by two bars one end of each of which is secured to a different end of the tine-carrying bar and the other end of each of which is pivotally connected to one end of a respective strip whereof the other end is pivotally connected to a lug on the frame remote from the tine-carrying bar.

4. A cultivating implement according to claim 3, wherein the pivot connections between the tine-presentation-determining bars and the respective strips are selectively locatable, so that the angle of presentation of the tines can be selected to accord with the nature of the word to be done and the tine sweeps or shovels to be used therefor.

5. A cultivating implement according to claim 1, in which the angle of presentation of the tines to the grounds is determined by two bars one end of each of which is secured to a different end of the tine-carrying bar and the other end of each of which is pivotally connected to one end of a respective strip whereof the other end is pivotally connected to a lug on the frame remote from the tine-carrying bar.

6. A cultivating implement according to claim 5, wherein the pivot connections between the tine-presentation-determining bars and the respective strips are selectively locatable, so that the angle of presentation of the tines can be selected to accord with the nature of the work to be done and the tine sweep or shovels to be used therefor.

7. A cultivating implement according to claim 5, wherein the pivot connections between the tine-presentation-determining bars and the respective strips are selectively locatable, so that the angle of presentation of the tines can be selected to accord with the nature of the work to be done and the tine sweeps or shovels to be used therefor.

* * * * *